United States Patent [19]

Hamanaka

[11] Patent Number: 4,877,670
[45] Date of Patent: * Oct. 31, 1989

[54] CORDIERITE HONEYCOMB STRUCTURAL BODY AND METHOD OF PRODUCING THE SAME

[75] Inventor: Toshiyuki Hamanaka, Suzuka, Japan

[73] Assignee: NGK Insulators, Ltd., Nagoya, Japan

[*] Notice: The portion of the term of this patent subsequent to Sep. 20, 2005 has been disclaimed.

[21] Appl. No.: 946,901

[22] Filed: Dec. 29, 1986

[30] Foreign Application Priority Data

Dec. 27, 1985 [JP] Japan .............................. 60-293691
Aug. 5, 1986 [JP] Japan ................................ 61-182824

[51] Int. Cl.$^4$ .............................................. B32B 3/12
[52] U.S. Cl. ........................................ 428/116; 165/10; 502/527
[58] Field of Search ............. 165/10 R; 428/116, 117, 428/118; 502/527; 55/523; 156/89

[56] References Cited

U.S. PATENT DOCUMENTS

| | | | |
|---|---|---|---|
| 3,790,654 | 2/1974 | Bagley | 428/116 X |
| 3,885,977 | 5/1975 | Lachman et al. | 428/116 X |
| 3,950,175 | 4/1976 | Lachman et al. | 501/80 |
| 3,954,672 | 5/1976 | Somers et al. | 428/116 X |
| 3,958,058 | 5/1976 | Elmer | 428/332 |
| 4,253,992 | 3/1981 | Soejima et al. | 428/116 X |
| 4,268,311 | 5/1981 | Ver Dow | 501/153 X |
| 4,280,845 | 7/1981 | Matsuhisa et al. | 501/43 |
| 4,293,514 | 10/1981 | Wada | 264/61 |
| 4,295,892 | 10/1981 | Matsuhisa et al. | 501/120 |
| 4,297,140 | 10/1981 | Paisley | 428/116 X |
| 4,416,675 | 11/1983 | Montierth | 55/502 |
| 4,421,699 | 12/1983 | Inoguchi et al. | 264/56 |
| 4,489,774 | 12/1984 | Ogawa et al. | 428/116 X |
| 4,645,700 | 2/1987 | Matsuhisa et al. | 165/10 X |
| 4,740,408 | 4/1988 | Mochida et al. | 502/527 X |
| 4,772,580 | 9/1988 | Hamanaka et al. | 502/527 X |

FOREIGN PATENT DOCUMENTS 0202107 11/1986 European Pat. Off. .
2306956 11/1976 France .

Primary Examiner—Henry F. Epstein
Attorney, Agent, or Firm—Arnold, White & Durkee

[57] ABSTRACT

Cordierite honeycomb structural bodies having coefficients of thermal expansion of not more than $1.0 \times 10^{-6}$, an improved thermal shock resistance, a very small leakage amount and an improved heat exchanging efficiency are provided by using very fine particles of kaolin and talc to restrict a total pore volume of a given pore diameter to a given range. The cordierite honeycomb structural bodies are useful in broader fields than conventional ones.

9 Claims, 4 Drawing Sheets

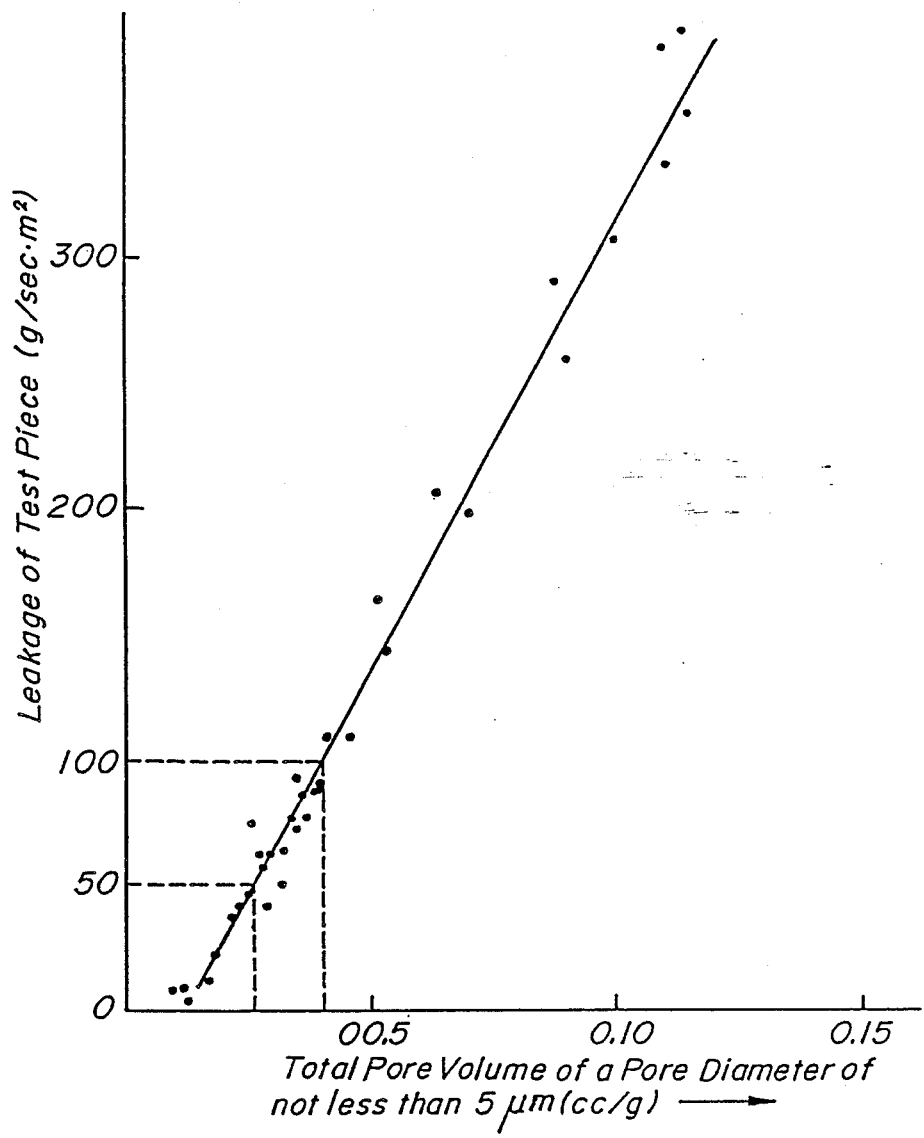
FIG_1

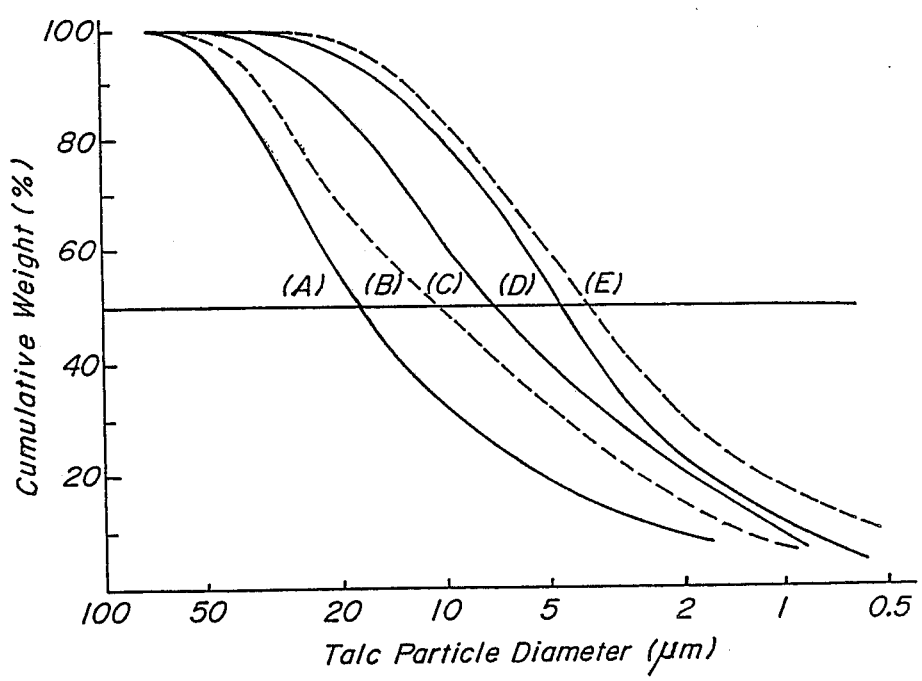
FIG_2

FIG_3
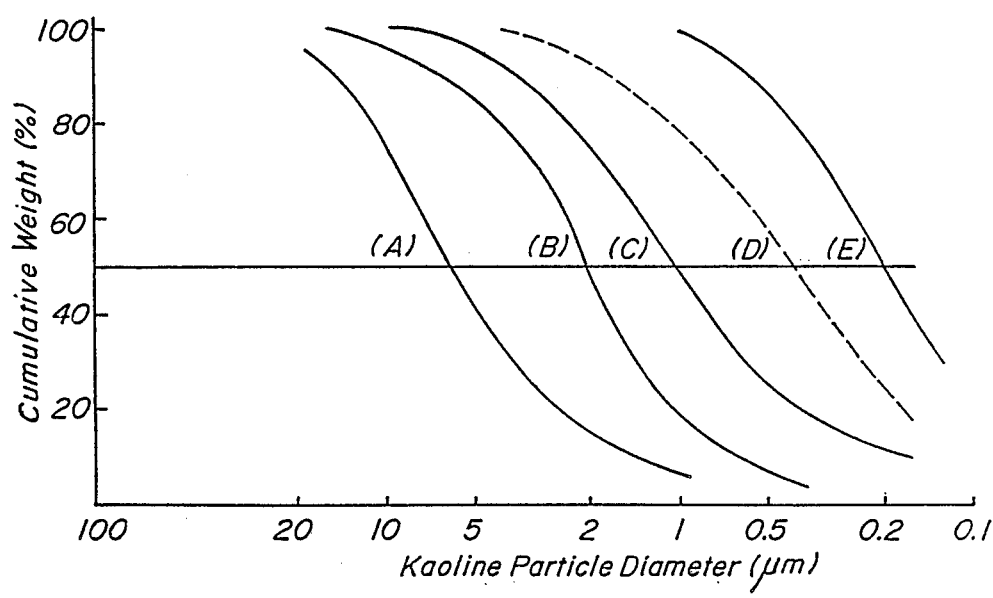
FIG_4a
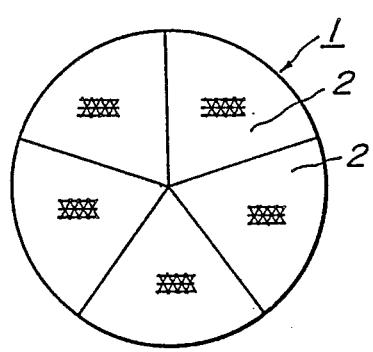
FIG_4b
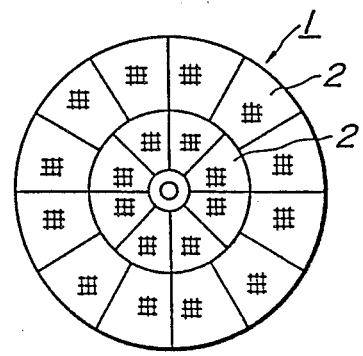

CORDIERITE HONEYCOMB STRUCTURAL BODY AND METHOD OF PRODUCING THE SAME

BACKGROUND OF THE INVENTION

1. Field of the Invention

The present invention relates to a cordierite honeycomb structural body, particularly, to a highly airtight cordierite honeycomb structural body for a rotary accumulative type or a heat transfer type heat exchanger, which have excellent thermal shock resistance, airtightness and heat resistance, and a method of producing the same.

2. Related Art

Recently, the desire for materials having excellent heat resistance and thermal shock resistance has increased along with the improvement of industrial techniques for use thereof. The thermal shock resistance of ceramics is influenced not only by the coefficient or thermal expansion, heat transfer coefficient, strength, elastic moldulus; Poisson's ratio and the like in a material, but also by the size, shape and heating and cooling conditions in an article.

It is known that among these factors influencing the thermal shock resistance, particularly, the contribution of the coefficient of thermal expansion is large. Particularly, when the heat flow rate is large, the thermal shock resistance is significantly influenced only by the coefficient of thermal expansion. Therefore, there is a strong demand for the development of low thermal expansion materials having excellent thermal shock resistance.

Heretofore, cordierite ceramics have been known as relatively low thermal expansion materials. However, the densification of cordierite ceramics by sintering is difficult in general. Particularly, for the production of low thermal expansion cordierite ceramics having coefficients of thermal expansion of, for example, $2.0 \times 10^{-6}/°C$. or less in a temperature range of from room temperature to 800° C., batch composition of raw materials have been used wherein the amounts of impurities such as alkali, (calcium, potassium, sodium) and the like which function as fluxes during firing the batch composition are limited to very minor amounts, so that cordierite honeycomb structural bodies obtained by firing the batch compositions have very small amounts of a glassy phase and hence are very porous and are not dense.

Accordingly, when such a cordierite ceramic is, for example, formed into a honeycomb structure to be used in a rotary accumulative type heat exchanger, fluid leakage is generated due to high porosity from open pores which communicate between the heating fluid side of a partition wall and the heat recovery side of a partition wall, particularly pores communicating with the surface of the partition wall defining the penetration holes of the honeycomb structural body, with the result being that the heat exchanging efficiency and overall efficiency of heat exchanger system, decrease, which is a serious defect.

Thus, there has strongly been demanded a low thermal expansion and highly airtight cordierite honeycomb structural body having improved thermal shock resistance.

Heretofore, the low thermal expansion of cordierite ceramics has been publicly known. For instance, U.S. Pat. No. 3,885,977 discloses an oriented cordierite ceramic having a coefficient of thermal expansion of less than $11 \times 10^{-7}/°C$.) in at least one direction in a temperature range of 25°–1,000° C., which is achieved by a planar orientation of clay platelets which occurs during the processing of stacked clay, or the use of platelet clay which also can result in such an orientation. However, that cordierite ceramic uses coarse talc having particle diameters of 10–20 $\mu$m and clays of wide particle diameters of 0.1–10 $\mu$m, and there is no disclosure concerning the pore structure of such materials.

Further, U.S. Pat. No. 3,950,175 discloses that a porous cordierite ceramic having open pores of a pore diameter of more than 10 $\mu$m can be obtained in an amount of at least 20% by substituting silica or a silica alumina source material such as pyrophyllite, kyanite, quartz or fused silica in part or whole for talc or clay in the raw materials from which such ceramics are made. However, there is no description of the total pore volume of a pore diameter of not less than 5 $\mu$m restricted to not more than 0.04 cc/g by using fine talc having an average particle diameter of not more than 7 $\mu$m, whereby the airtight properties increase.

Furthermore, U.S. Pat. No. 4,280,845 discloses a positive correlation between the average particle diameter of talc particles and the average pore diameter of pores in cordierite ceramics. However, in order to restrict the coefficient of thermal expansion to not more than $1.0 \times 10^{-6}/°C$., the talc particles should be made coarse, for example having an average particle diameter of 10–50 $\mu$m. Therefore, it is difficult to conceive a low thermal expansion and highly airtight cordierite ceramic from that disclosure.

Finally, U.S. Pat. No. 4,489,774 discloses a rotary accumulative type heat exchanger consisting of highly airtight cordierite ceramics, wherein a filling material adhesively seals open pores on the surface of the partition walls defining the penetration holes of the honeycomb structural body, consisting essentially of cordierite ceramic of a porosity of 20–45%, but does not disclose a total pore volume of a pore diameter of not less than 5 $\mu$m restricted to not more than 0.04 cc/g by using fine talc and kaolin particles having an average particle diameter of not more than 7 $\mu$m and not more than 2 $\mu$m respectively, whereby the airtight properties are improved. Additionally, the method described in U.S. Pat. No. 4,489,774 requires further steps for carrying, as a slip, a filling material on the fired cordierite honeycomb and refiring it, so that there are drawbacks such as the likehood of plugging the holes of the cells, and of high costs due to the more complex manufacturing steps.

SUMMARY OF THE INVENTION

The present invention obviates said shortcomings and provides a highly airtight cordierite honeycomb structural body to achieve a compatability between airtight property and low thermal expansion properties, which are difficult to achieve in the conventional cordierite ceramics.

An object of the invention is to provide a cordierite honeycomb structural body comprising crystalline phases consisting essentially of cordierite, a total pore volume of a pore diameter of not less than 5 $\mu$m of not more than 0.04 cc/g, a coefficient of thermal expansion of not more than $1.0 \times 10^{-6}/°C$. in a temperature range of 40°–800° C., and a chemical composition by weight of 45–56% of $SiO_2$, 30–45% of $Al_2O_3$ and 12–16% of MgO as main components.

Another object of the invention is to provide a method of producing a cordierite honeycomb structural body, comprising preparing a mixture of very fine talc particles of an average particle diameter of not more than 7 μm, very fine kaolin particles of an average particle diameter of not more than 2 μm and not exceeding one-third (⅓) of the average particle diameter of talc and optionally, other raw materials so as to produce cordierite having a chemical composition by weight of 42–56% of $SiO_2$, 30–45% of $Al_2O_3$, 12–16% of MgO, adding a plasticizer and a binder to the mixture to obtain a plasticized deformable batch, extruding the plasticized batch to form a honeycomb structural body, drying the extruded honeycomb structural body, and firing the dried honeycomb structural body at a temperature of 1,350°–1,440° C.

A further object of the invention is to provide a cordierite honeycomb structural body comprising crystalline phases consisting essentially of cordierite, a total pore volume of a pore diameter of not less than 2 μm of not more than 0.05 cc/g or, when the porosity in the ceramic material is not more than 25%, of not more than 0.08 cc/g, a coefficient of thermal expansion of not more than $1.0 \times 10^{-6}$/°C. in a temperature range of 40°–800° C., and a chemical composition by weight of 42–56% of $SiO_2$, 30–45% of $Al_2O_3$ and 12–16% of MgO, as main components.

A still further object of the invention is to provide a method of producing a cordierite honeycomb structural body, comprising preparing the mixture of very fine talc particles of an average particle diameter of not more than 5 μm, very fine kaolin particles of an average particle diameter of not more than 2 μm and not exceeding one-third (⅓) of the average particle diameter of talc, very fine alumina and/or aluminum hydroxide of an average particle diameter of not more than 2 μm and, optionally, other raw materials so as to produce a cordierite having a chemical composition by weight of 42–56% of $SiO_2$, 30–45% of $Al_2O_3$, 12–16% of MgO, adding a plasticizer and a binder to the mixture to obtain a plasticized deformable batch, extruding the plasticized batch to form a honeycomb structural body, and firing the dried honeycomb structural body at a temperature of 1,350°–1,440° C.

Another object of the invention is to provide a method of producing a cordierite honeycomb structural body, comprising preparing a mixture of very fine talc particles of an average particle diameter of not more than 5 μm, very fine kaolin particles of an average particle diameter of not more than 2 μm and not exceeding one-third (⅓) of the average particle diameter of talc, very fine alumina and/or aluminum hydroxide particles of an average particle diameter of not more than 2 μm, highly pure amorphous silica of an average particle diameter of not more than 8 μm and, optionally, other raw materials so as to produce a cordierite having a chemical composition by weight of 42–56% of $SiO_2$, 30–45% of $Al_2O_3$, 12–16% of MgO, adding a plasticizer and a binder to the mixture to obtain a plasticized deformable batch, extruding the plasticized batch to form a honeycomb structural body, drying the extruded honeycomb structural body, and firing the dired honeycomb structural body at a temperature of 1,350°–1,440° C.

BRIEF DESCRIPTION OF THE DRAWINGS

For a better understanding of the present invention, reference is made to the accompanying drawings, in which:

FIG. 1 is a graph showing the relationship between total pore volume of pores of a diameter not less than 5 μm (cc/g) and leakage of the test piece (g/sec.m²). This graph includes the data from Table 2 herein as well as additional data derived from the methods disclosed in the examples herein.

FIG. 2 is a graph showing the relationships between the particle size distribution of fine talc raw material and the cumulative weight percentage, as used in the examples, particularly for tables (A)–(E) of Table 1(a) herein.

FIG. 3 is a graph showing the relationships between the particle size distribution of the fine kaolin raw material and the cumlative weight percentages, as used in the examples, particularly for kaolins (A)–(E) of Table 1(a) herein.

FIGS. 4a and 4b are schematic perspective end views showing an embodiment of rotary accumulating type heat exchanger of the present invention.

DESCRIPTION OF THE PREFERRED EMBODIMENT

Figure 5:
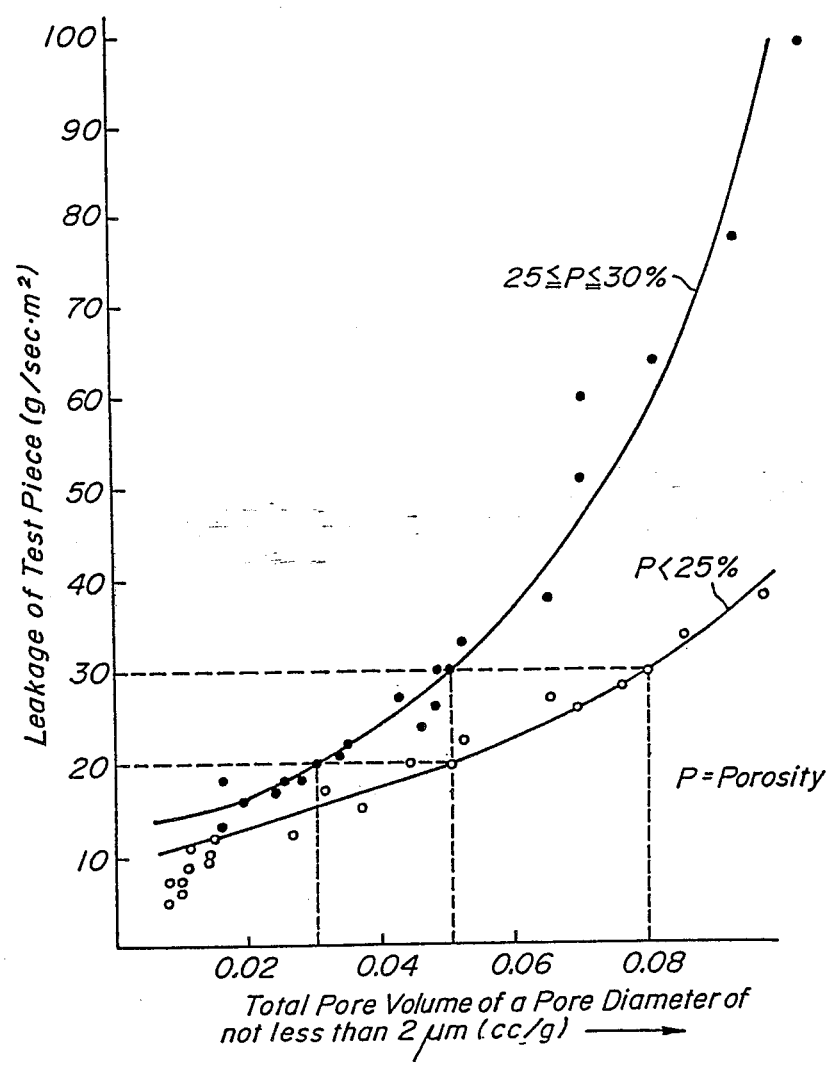
FIG. 5 is a graph showing the relationships between the number of pores of a pore diameter of not less than 2 μm and the leakage amounts of test pieces under air pressure of 1.4 kg/cm².

The inventors have found that in a cordierite honeycomb structural body, the total pore volume of a pore diameter of not less than 5 μm is restricted to not more than 0.04 cc/g by using very fine talc particles of an average particle diameter of not more than 7 μm and very fine kaolin particles of an average particle diameter of not more than 2 μm and not exceeding one-third (⅓) of the average particle diameter of talc, whereby a substantially airtight cordierite honeycomb structural body having a coefficient of thermal expansion of not more than $1.0 \times 10^{-6}$/°C. in a temperature range of 40°–800° C. is produced. Restriction of the average particle diameter of talc particles to not more than 7 μm is effective for making the pore diameter small. Further, use of kaolin particles of an average particle diameter of not more than 2 μm is effective for controlling the porosity. Furthermore, use of a combination of talc particles of an average particle diameter of not more than 7 μm and kaolin particles of an average diameter not exceeding one-third (⅓) of the average particle diameter of talc accelerates the orientation of the cordierite crystals at the partition walls of the cordierite crystals at the partition walls of the cordierite honeycomb structural body, which contributes to low thermal expansion.

According to the invention, the honeycomb structural body preferably has a chemical composition by weight of 42–56%, preferably 47–53% of $SiO_2$, 30–45%, preferably 32–38% of $Al_2O_3$ and 12–16%, preferably 12.5–15% of MgO. The honeycomb structure may additionally contain unavoidably admixtured components such as $TiO_2$, CaO, KNaO, $Fe_2O_3$ in total amounts of not more than 2.5%, but the content of $P_2O_5$ is preferably less than 0.1%. The reason for restricting the content of such materials is that the crystalline phases consist essentially of a cordierite crystal phase and the high thermal expansion glass phases resulting from the impurities are removed.

The inventors have also found that in firing the dried extruded article of a honeycomb structure, the heating temperature is elevated at an average temperature increase rate of 20°-60° C./hr in a temperature range of 1,100°-1,350° C. immediately before the firing temperature, thereafter it is preferably fired at a temperature of 1,350°-1,440° C. If the average temperature increase rate is less than 20° C./hr, the coefficient of thermal expansion becomes too large, and if it exceeds 60° C./hr, the pore diameter becomes too large during firing, as a result of which the airtight property of the body deteriorates. The average temperature increase rate is preferably within the range of 30°-50° C./hr. In addition, the crystal phase in the body can consist essentially of a cordierite crystal phase by firing the dried extruded article at a temperature of 1,350°-1,440° C.

The reason for restricting the total pore volume of a pore diameter of not less than 5 $\mu$m to not more than 0.04 cc/g, preferably not more than 0.026 cc/g is that the fluid leakage through the thin walls of the honeycomb structure, as shown in FIGS. 4a and 4b, results mainly from pores of a pore diameter of not less than 5 $\mu$m. In order to satisfy this condition, the porosity is preferably restricted to not more than 30%. Referring to FIGS. 4a and 4b, a rotary cordierite heat regenerator 1 of a heat accumulator type comprises a plurality of matrix segments 2 of a honeycomb structural body, each of which matrix segments 2 mainly consist of cordierite.

The present invention includes use of calcined talc and calcined kaolin which are effective for preventing the formation of cracks in the honeycomb structural bodies caused by shrinkage, etc., during the drying and firing steps, when using the fine raw materials kaolin and talc. Use of a higher temperature for calcining talc and kaolin increases the porosity of the coefficient of thermal expansion of the resultant honeycomb structural bodies, so that the calcining temperature should preferably be made as low as possible, if calcined talc or kaolin is used. The unexpected and splended effects of the present invention cannot be attained, unless the same fine particles of calcined talc and kaolin as those of the raw materials talc and kaolin are used.

The other raw materials for cordierite, namely, an alumina source material such as alumina, aluminum hydroxide, etc., and a silica source material such as amorphous silica, quartz sand, etc., which are the same ones as those used conventionally, can be used. However, the amount of impurities such as alkali in the chemical composition of the raw materials has to be properly adjusted, and particle sizes of the raw materials must be properly adjusted by excluding the coarse particles, depending on the thickness of the partition walls of the honeycomb structural bodies to be produced.

Thus, according to the invention, there is produced a cordierite honeycomb structural body comprising a crystal phase consisting essentially of cordierite, a total pore volume of a pore diameter of not less than 5 $\mu$m of not more than 0.04 cc/g and a coefficient of thermal expansion of not more than $1.0 \times 10^{-6}$/°C. in a temperature range of 40°-800° C., by preparing a mixture of very fine talc particles of an average particle diameter of not more than 7 $\mu$m, very fine kaolin particles of an average particle diameter of not more than 2 $\mu$m and not exceeding one-third ($\frac{1}{3}$) of the average particle diameter of talc and, optionally, other raw materials so as to produce the cordierite of a chemical composition by weight of 42-56%, preferably 47-53% of $SiO_2$, 30-45%, preferably 32-38% of $Al_2O_3$, 12-16%, preferably 12.5-15% of MgO, adding a plasticizer and a binder to the mixture to obtain a plasticized deformable batch, extruding the plasticized batch to form a honeycomb structural body, drying the extruded honeycomb structural body, elevating the temperature of the dried honeycomb structural body at an average temperature increase rate of 20°-60° C./hr in a temperature range of 1,100°-1,350° C., immediately before firing, and firing the honeycomb structural body at a temperature of 1,350°-1,440° C.

The firing process is usually carried out for about 0.5-12 hours. The resulting honeycomb structrual body has crystalline phases consisting essentially of not less than 90% by weight of cordierite. Other crystals consist essentially of mullite and spinel, inclusive of sapphirine, but the amounts thereof are not more than 2.5% by weight, respectively. When the total pore volume of a pore diameter of not less than 5 $\mu$m does not exceed 0.04 cc/g, particularly does not exceed 0.026 cc/g, the honeycomb structural body substantially exhibits an airtight property of a leakage amount of not more than 100 g/sec.m$^2$, particularly not more than 50 g/sec.m$^2$ under a pressure of 1.4 kg/cm$^2$, and consequently is preferred for use as a heat exchanger.

The inventors have also found that in a cordierite honeycomb structure, the total pore volume of a pore diameter of not less than 2 $\mu$m is restricted to not more than 0.05 cc/g or the total pore volume of a pore diameter of not less than 2 $\mu$m where the porosity in the ceramic material is not more than 25% to not more than 0.08 cc/g by using very fine talc of an average particle diameter of not more than 5 $\mu$m, very fine kaolin particles of an average particle diameter of not more than 2 $\mu$m and not exceeding one-third ($\frac{1}{3}$) of the average particle diameter of talc, and very fine alumina and/or aluminum, hydroxide particles of an average particle diameter of not more than 2 $\mu$m, or higly pure amorphous silica particles of an average particle diameter of not more than 8 $\mu$m therewith, whereby a substantially airtight cordierite honeycomb structural body having a coefficient of thermal expansion of not more than $1.0 \times 10^{-6}$/°C. in a temperature range of 40°-800° C. is produced. Restriction of the average particle diameter of talc particles to not more than 5 $\mu$m is effective for making the pore diameter small. Further, use of kaolin particles of an average particle diameter of not more than 2 $\mu$m is effective for controlling the porosity. Furthermore, use of a combination of talc particles of an average particle diameter of not more than 5 $\mu$m and kaolin particles of an average diameter not exceeding one-third ($\frac{1}{3}$) of the average particle diameter of talc accelerates the orientation of the cordierite crystals at the partition walls of the cordierite honeycomb structural body, which contributes to low thermal expansion.

Use of alumina and/or aluminum hydroxide particles of an average particle diameter of not more than 2 $\mu$m attains fine pore diameter of low porosity, which has never before been obtained merely with the use of fine talc and kaolin particles.

Furthermore, among various aluminas, alumina of low sodium content is used to obtain a stable fine pore diameter. Restriction of the average particle diameter of highly pure amorphous silica particles to not more than 8 $\mu$m is effective for controlling the pore diameter and the porosity. In this case, it is important that the silica be amorphous. For instance, crystalline silicas such as quartz and so on unfavorably result in a considerable increase in porosity. In addition to fine alumina and/or aluminum hydroxide particles, use of amorphous silica gives considerably low thermal expansion.

According to the invention, the honeycomb structural body is preferred to have a chemical composition by weight of 42–56%, preferably 47–53% of $SiO_2$, 30–45%, preferably 32–38% of $Al_2O_3$ and 12–16%, preferably 12, 5–15% of MgO. The honeycomb structure may additionally contain unavoidably admixtured components such as $TiO_2$, CaO, KNaO, $Fe_2O_3$ in total amounts of not more than 2.5%, but the content of $P_2O_5$ is preferably less than 0.1%. The reason for restricting the contents of such materials is that the crystalline phases consist essentially of a cordierite crystalline phase and the high thermal expansion glass phases resulting from impurities are removed.

Control of the particle sizes of the raw materials such as alumina and/or aluminum hydroxide or amorphous silica renders it unnecessary to especially limit the average temperature increase rate, so that the rapid rate of not less than 50° C./hr is capable of attaining low thermal expansion, which is seen to be preferred to improve the thermal shock resistance. In addition, the crystalline phases can consist essentially of a cordierite crystalline phase by firing the honeycomb structural body at a temperature of 1,350°–1,440° C.

The reason for restricting the total pore volume of a pore diameter of not less than 2 $\mu$m to not more than 0.05 cc/g, preferably not more than 0.03 cc/g or the total pore volume of a pore diameter of not less than 2 $\mu$m where the porosity in the ceramic material is not more than 25% to not more than 0.08 cc/g, preferably not more than 0.05 cc/g, is that the fluid leakage through thin wall of the honeycomb structure, as shown in FIGS. 4a and 4b results mainly from pores of a pore diameter of not less than 2 $\mu$m. In order to satisfy this condition, the porosity is preferably restricted to not more than 30%, preferably not more than 25%.

The present invention can include use of calcined talc and calcined kaolin even when using fine alumina and/or aluminum hydroxide.

Thus, according to the invention, there are produced cordierite honeycomb structural bodies comprising crystalline phases consisting essentially of cordierite, a total pore volume of a pore diameter of not less than 2 $\mu$m of not more than 0.05 cc/g or, where the porosity in the ceramic material is not more than 25%, of not more than 0.08 cc/g, and a coefficient of thermal expansion of not more than $1.0\times10^{-6}$/°C. in a temperature range of 40°–800° C., by preparing a mixture of very fine talc particles of an average particle diameter of not more than 5 $\mu$m, very fine kaolin particles of an average particle diameter of not more than 2 $\mu$m and not exceeding one-third ($\frac{1}{3}$) of the average particle diameter of talc, very fine alumina and/or aluminum hydroxide of an average particle diameter of not more than 2 $\mu$m and, optionally, other raw materials so as to produce a cordierite of a chemical composition by weight of 42–56%, preferably 47–53% of $SiO_2$, 30–45%, preferably, 32–38% of $Al_2O_3$, 12–16%, preferably 12.5–15% of MgO, adding a plasticizer and a binder to the mixture to obtain a plasticized deformable batch, extruding the plasticized batch to form a honeycomb structural body, drying the extruded honeycomb structure body, and firing the honeycomb structural body at a temperature of 1,350°–1,440° C.

Further, according to the invention there is produced a cordierite honeycomb structural body comprising crystalline phases consisting essentially of cordierite, a total pore volume of a pore diameter of not less than 2 $\mu$m of not more than 0.05 cc/g or where the porosity in the ceramic material is not more than 25%, of not more than 0.08 cc/g, and a coefficient of thermal expansion of not more than $0.6\times10^{-6}$/°C. in a temperature range of 40°–800° C., by preparing the mixture of very fine talc of an average particle diameter of not more than 5 $\mu$m, very fine kaolin particles of an average particle diameter of not more than 2 $\mu$m and not exceeding one-third ($\frac{1}{3}$) of the average particle diameter of talc, very fine alumina and/or aluminum hydroxide particles of an average particle diameter of not more than 2 $\mu$m, highly pure amorphous silica of an average particle diameter of not more than 8 $\mu$m and, optionally, other raw materials so as to produce a cordierite of a chemical composition by weight of 42–56%, preferably 47–53% of $SiO_2$, 30–45%, preferably 32–38% of $Al_2O_3$, 12–16%, preferably 12.5–15% of MgO, adding a plasticizer and a binder to the mixture to obtain a plasticized deformable batch, extruding the plasticized batch to form a honeycomb structural body, drying the extruded honeycomb structural body, and firing the honeycomb structural body at a temperature of 1,350°–1,440° C.

When the total pore volume of pore diameter of not less than 2 $\mu$m does not exceed 0.05 cc/g, particularly does not exceed 0.03 cc/g, the honeycomb structural body substantially exhibits an airtight property of a leakage amount of not more than 30 g/sec.m$^2$, particularly not more than 20 g/sec.m$^2$ under a pressure of 1.4 kg/cm$^2$, and consequently, is preferred for use as a heat exchanger.

In the honeycomb structural body according to the invention, the total pore volume of a pore diameter of not less than 5 $\mu$m is not more than 0.04 cc/g and the porosity is not more than 30%, so that the leakage amount is small and the heat exchanging efficiency is high. Further, the coefficient of thermal expansion is small, not more than $1.0\times10^{-6}$/°C. in a temperature range of 40°–800° C., so that the thermal shock resistance is high.

Further, in the honeycomb structural body according to the invention, the total pore volume of a pore diameter of not less than 2 $\mu$m is not more than 0.05 cc/g or the total volume of pores of a pore diameter of not less than 2 $\mu$m where the porosity of the ceramic material is not more than 25% is not more than 0.08 cc/g, so that the leakage amount is smaller and the heat exchanging efficiency is higher. In addition, the coefficient of thermal expansion is small, not more than $1.0\times10^{-6}$/°C., preferably very small as not more than $0.6\times10^{-6}$/°C. in a temperature range of 40°–800° C., so that the thermal shock resistance is very high. Furthermore, it is possible to make the walls thin such as a partition wall thickness of not more than 203 m (8 mil), so that the pressure loss is small and a high density of cells is attained. Therefore, a ceramic heat exchanger of a high heat exchanging efficiency can be obtained. Furthermore, a pore diameter is small and the porosity is also small, so that the strength of the honeycomb structural body is higher than that of the conventional honeycomb structural body and consequently thin walls can be attained.

Hereinafter, the present invention will be explained in more detail with reference to particular Examples.

EXAMPLE 1

Raw materials of chemical compositions and particle sizes as shown in the following Table 1 are mixed based on a batch composition and the particle sizes of talc and kaolin particles as shown in Table 2 to prepare batches of Nos. 1–30 of Table 2. To 100 parts by weight of each batch is added 4.5 parts by weight of methylcellulose and a suitable amount of water and the resulting mixture is kneaded to produce an extrudable blend. The raw materials used are preliminarily passed through a sieve of 63 μm. Thereafter, each blend of the respective batch is formed by a known extrusion means into a cylindrical honeycomb structural body of a diameter of 93 mm and a height of 100 mm having a rectangular cell structure (short side/long side=1/1.73), a cell number of 167 per $cm^2$ and a partition wall thickness of 120 μm. Each honeycomb structural body is dried and fired at a firing condition as shown in Table 2 to obtain sintered honeycomb structural bodies. The following properties of the sintered bodies are evaluated: coefficient of thermal expansion (CTE) in a temperature range of 40°–800° C., porosity, total volume of pore diameter of not less than 5 μm, leakage amount, amount of cordierite crystals, and thermal shock resistance. The results of the evaluation are also shown in Table 2. All the sintered bodies have chemical compositions of $P_2O_5$ content of less than 0.1%.

In the data stated herein ignition loss ("Ig. loss") means percentage loss in weight caused by strong heating at about 1,100° C. in an oxidizing atmosphere. This loss represents the total content of absorbed water and water of crystallization present in the material before heating.

EXAMPLE 2

The batch of No. 4 of Table 2 are extruded from dies of different cell structures in the same manner as in Example 1, and the green honeycomb structural bodies are fired to produce cylindrical honeycomb structural bodies of Nos. 31–40 of a diameter of 93 mm and a height of 100 mm and cell structures as shown in Table 3. The thus produced honeycomb structural bodies are evaluated for pressure loss, leakage amount and coefficient of thermal expansion (CTE). The results of the evaluation are also shown in Table 3.

TABLE 1

|   | Average particle diameter (μm) | Ig.loss | $SiO_2$ | $Al_2O_3$ | MgO | $TiO_2$ | $Fe_2O_3$ | CaO + $Na_2O$ + $K_2O$ |
|---|---|---|---|---|---|---|---|---|
| Talc (A) | 18.0 | 5.8 | 61.2 | 0.9 | 30.9 | — | 0.8 | 0.3 |
| Talc (B) | 10.5 | 5.7 | 60.9 | 1.2 | 30.8 | — | 0.9 | 0.3 |
| Talc (C) | 7.0 | 5.6 | 61.3 | 0.9 | 30.9 | — | 0.9 | 0.3 |
| Talc (D) | 4.5 | 5.7 | 60.8 | 1.3 | 30.8 | — | 1.0 | 0.3 |
| Talc (E) | 3.7 | 5.7 | 61.1 | 1.1 | 30.8 | — | 0.9 | 0.3 |
| Talc (F) | 5.0 | 5.7 | 61.6 | 0.9 | 30.5 | — | 0.8 | 0.3 |
| Calcined talc*[1] | 4.5 | 0.1 | 64.4 | 1.4 | 32.6 | — | 1.0 | 0.3 |
| Kaoline (A) | 5.9 | 13.9 | 45.6 | 38.7 | — | 0.8 | 0.3 | 0.2 |
| Kaoline (B) | 2.0 | 13.9 | 45.7 | 38.8 | — | 0.9 | 0.3 | 0.2 |
| Kaoline (C) | 1.0 | 13.9 | 45.5 | 38.6 | — | 1.0 | 0.4 | 0.2 |
| Kaoline (D) | 0.4 | 13.9 | 45.5 | 38.6 | — | 0.8 | 0.4 | 0.2 |
| Kaoline (E) | 0.2 | 13.9 | 45.2 | 37.9 | — | 1.4 | 0.8 | 0.2 |
| Calcined kaoline (A)*[2] | 1.0 | 0.1 | 53.1 | 45.0 | — | 0.9 | 0.4 | 0.2 |
| Calcined kaoline (B)*[3] | 2.0 | 0.1 | 53.1 | 45.1 | — | 0.8 | 0.4 | 0.2 |
| Calcined kaoline (C)*[4] | 5.9 | 0.1 | 53.2 | 45.0 | — | 0.8 | 0.4 | 0.2 |
| Alumina | 4.0 | 0.2 | — | 99.2 | — | — | — | 0.3 |
| Aluminum hydroxide | 1.2 | 33.7 | — | 64.5 | — | — | — | 0.3 |
| Silica | 9.1 | 0.3 | 99.4 | 0.1 | — | — | 0.1 | — |

*[1]Prepared by firing talc (D) at 1000° C. for 2 hours
*[2]Prepared by firing kaoline (C) at 1000° C. for 4 hours
*[3]Prepared by firing kaoline (B) at 1000° C. for 4 hours
*[4]Prepared by firing kaoline (A) at 1000° C. for 4 hours
*Particle size distributions and average particle diameter are those based on the principle of X-ray sedimentation method, and measured by Sedigraph (Trade name) of Micrometrics Co.

TABLE 2

| | Batch composition (wt %) | | | | | | | |
|---|---|---|---|---|---|---|---|---|
| Test No. | Talc (average particle diameter μm) | Calcined talc | Kaolin (average particle diameter μm) | Calcined kaoline (average particle diameter μm) | Alumina | Aluminum hydroxide | Silica | Ratio of average particle diameter (kaoline/talc) |
| 1 | 41.0(10.5) | — | 25.0(0.4) | 20.5(1.0) | 13.5 | — | — | 1/16 |
| 2 | 41.0(7.0) | — | 25.0(0.4) | 20.5(1.0) | 13.5 | — | — | 1/10 |
| 3 | 41.0(4.5) | — | 25.0(0.4) | 20.5(1.0) | 13.5 | — | — | 1/6.7 |
| 4 | 41.0(3.7) | — | 25.0(0.4) | 20.5(1.0) | 13.5 | — | — | 1/5.5 |
| 5 | 41.0(4.5) | — | 25.0(0.2) | 20.5(1.0) | 13.5 | — | — | 1/8.0 |
| 6 | 41.0(3.7) | — | 25.0(0.2) | 20.5(1.0) | 13.5 | — | — | 1/6.6 |
| 7 | 41.0(4.5) | — | 25.0(5.9) | 20.5(5.9) | 13.5 | — | — | 1/0.8 |
| 8 | 41.0(7.0) | — | 25.0(2.0) | 20.5(1.0) | 13.5 | — | — | 1/4.5 |
| 9 | 41.0(4.5) | — | 25.0(1.0) | 20.5(1.0) | 13.5 | — | — | 1/4.5 |
| 10 | 41.0(4.5) | — | 25.0(0.4) | 20.5(1.0) | 13.5 | — | — | 1/6.7 |

TABLE 2-continued

| Test No. | Talc (average particle diameter μm) | Calcined talc | Kaoline (average diameter μm) | Calcined kaoline (average particle diameter μm) | particle Alumina | Aluminum hydroxide | Silica | Ratio of average particle diameter (kaoline/talc) |
|---|---|---|---|---|---|---|---|---|
| 11 | 41.0(4.5) | — | 25.0(0.4) | 20.5(1.0) | 13.5 | — | — | 1/6.7 |
| 12 | 41.0(4.5) | — | 25.0(0.4) | 20.5(1.0) | 13.5 | — | — | 1/6.7 |
| 13 | 41.0(4.5) | — | 25.0(0.4) | 20.5(1.0) | 13.5 | — | — | 1/6.7 |
| 14 | 40.5(4.5) | — | 20.0(0.4) | 20.0(1.0) | 13.7 | — | — | 1/6.1 |
| 15 | 40.5(4.5) | — | 20.0(0.4) | 25.8(1.0) | 13.7 | — | — | 1/6.1 |

Properties of sintered body

| Test No. | Firing conditions Temperature raising rate (°C./Hr) | Maximum temperature (°C.) | Holding time (Hr) | CTE ×10⁻⁶ (/°C.) | Porosity*2 (%) | Total volume*3 of pores of a pore diameter of not less than 5 μm (cc/g) | Leakage*4 amount (g/s·m²) | Amount*5 of cordierite crystal (wt %) | Thermal*6 shock resistance (°C.) |
|---|---|---|---|---|---|---|---|---|---|
| 1 | 50 | 1410 | 6 | 0.5 | 30.5 | 0.088 | 292 | 95 | 850 |
| 2 | 50 | 1410 | 6 | 0.5 | 29.8 | 0.037 | 78 | 94 | 900 |
| 3 | 50 | 1410 | 6 | 0.6 | 27.6 | 0.026 | 49 | 95 | 850 |
| 4 | 60 | 1410 | 6 | 0.7 | 26.9 | 0.022 | 37 | 95 | 800 |
| 5 | 40 | 1415 | 8 | 0.5 | 25.9 | 0.013 | 5 | 93 | 900 |
| 6 | 40 | 1415 | 8 | 0.6 | 25.0 | 0.010 | 8 | 93 | 850 |
| 7 | 30 | 1420 | 6 | 1.1 | 31.2 | 0.053 | 145 | 91 | 700 |
| 8 | 30 | 1420 | 6 | 1.0 | 30.0 | 0.040 | 92 | 92 | 750 |
| 9 | 30 | 1420 | 6 | 0.8 | 27.2 | 0.025 | 44 | 93 | 800 |
| 10 | 15 | 1410 | 6 | 1.1 | 25.8 | 0.012 | 8 | 93 | 700 |
| 11 | 20 | 1410 | 6 | 0.9 | 26.0 | 0.018 | 22 | 95 | 750 |
| 12 | 35 | 1410 | 6 | 0.7 | 26.2 | 0.026 | 45 | 96 | 800 |
| 13 | 80 | 1410 | 6 | 0.4 | 29.5 | 0.046 | 110 | 94 | 900 |
| 14 | 60 | 1350 | 12 | 1.0 | 30.0 | 0.039 | 89 | 90 | 750 |
| 15 | 60 | 1430 | 2 | 0.6 | 26.1 | 0.034 | 78 | 94 | 850 |

Batch composition (wt %)

| Test No. | Talc (average particle diameter μm) | Calcined talc | Kaoline (average diameter μm) | Calcined kaoline (average particle diameter μm) | particle Alumina | Aluminum hydroxide | Silica | Ratio of average particle diameter (kaoline/talc) |
|---|---|---|---|---|---|---|---|---|
| 16 | 40.5(4.5) | — | 20.0(0.4) | 25.8(1.0) | 13.7 | — | — | 1/6.1 |
| 17 | 39.0(4.5) | — | 20.0(5.9) | 15.0(5.9) | 10.5 | 5.0 | 1/0.8 | |
| 18 | 40.7(18) | — | 28.1(5.9) | 16.7(5.9) | 14.5 | — | — | 1/3.1 |
| 19 | 40.7(18) | — | 28.1(5.9) | 16.7(5.9) | 14.5 | — | — | 1/3.1 |
| 20 | 30.5(4.5) | 10.0 | 21.7(0.2) | 23.3(1.0) | 14.5 | — | — | 1/7.3 |
| 21 | 24.2(3.7) | 15.0 | 20.8(0.2) | 25.1(1.0) | 14.9 | — | — | 1/6.3 |
| 22 | 39.1(4.5) | — | — | — | 19.1 | 19.2 | 22.6 | — |
| 23 | 40.7(5.0) | — | 28.1(2.0) | 16.7(1.0) | 14.5 | — | — | 1/3.1 |
| 24 | 40.7(3.7) | — | 28.1(2.0) | 16.7(1.0) | 14.5 | — | — | 1/2.3 |
| 25 | 40.7(4.5) | — | 28.1(2.0) | 16.7(2.0) | 14.5 | — | — | 1/2.3 |
| 26 | 40.7(0.2) | — | 28.1(0.2) | 16.7(1.0) | 14.5 | — | — | 1/10 |
| 27 | 40.7(5.0) | — | 28.1(1.0) | 16.7(1.0) | 14.5 | — | — | 1/5.0 |
| 28 | 40.7(5.0) | — | 28.1(0.2) | 16.7(2.0) | 14.5 | — | — | 1/5.7 |
| 29 | 40.7(7.0) | — | 28.1(0.2) | 16.7(2.0) | 14.5 | — | — | 1/8.0 |
| 30 | 40.7(7.0) | — | 28.1(2.0) | 16.7(2.0) | 14.5 | — | — | 1/3.5 |

Properties of sintered body

| Test No. | Firing conditions Temperature raising rate (°C./Hr) | Maximum temperature (°C.) | Holding time (Hr) | CTE ×10⁻⁶ (/°C.) | Porosity*2 (%) | Total volume*3 of pores of a pore diameter of not less than 5 μm (cc/g) | Leakage*4 amount (g/s·m²) | Amount*5 of cordierite crystal (wt %) | Thermal*6 shock resistance (°C.) |
|---|---|---|---|---|---|---|---|---|---|
| 16 | 60 | 1440 | 0.5 | 0.5 | 25.8 | 0.032 | 64 | 91 | 850 |
| 17 | 50 | 1410 | 6 | 1.2 | 31.0 | 0.110 | 387 | 90 | 650 |
| 18 | 50 | 1410 | 6 | 0.7 | 35.8 | 0.114 | 393 | 96 | 800 |
| 19*7 | 50 | 1410 | 24 | 1.1 | 28.2 | 0.070 | 54 | 88 | 700 |
| 20 | 40 | 1410 | 0.5 | 0.6 | 28.2 | 0.025 | 43 | 95 | 850 |
| 21 | 40 | 1410 | 6 | 0.8 | 28.7 | 0.024 | 43 | 95 | 800 |
| 22 | 50 | 1415 | 6 | 1.1 | 38.0 | 0.148 | >400 | 90 | 700 |
| 23 | 30 | 1415 | 6 | 1.0 | 29.7 | 0.037 | 88 | 94 | 750 |
| 24 | 30 | 1415 | 6 | 1.2 | 28.8 | 0.030 | 62 | 94 | 650 |
| 25 | 30 | 1415 | 6 | 1.1 | 29.1 | 0.035 | 81 | 94 | 700 |
| 26 | 40 | 1410 | 6 | 0.6 | 27.2 | 0.023 | 37 | 93 | 850 |
| 27 | 40 | 1410 | 6 | 0.8 | 27.9 | 0.026 | 50 | 93 | 800 |
| 28 | 40 | 1410 | 6 | 0.7 | 27.4 | 0.024 | 40 | 93 | 800 |
| 29 | 20 | 1425 | 8 | 0.6 | 28.9 | 0.035 | 78 | 95 | 850 |

TABLE 2-continued

| 30 | 20 | 1425 | 8 | 0.7 | 29.5 | 0.040 | 98 | 96 | 800 |

*[1] Average temperature raising rate in a temperature range of 1,100-1,350° C.
*[2] Mercury porosimeter. Calculated on total pore volume (assumed cordierite true desity of 2.52)
*[3] Mercury porosimeter
*[4] Measured with the use of honeycomb structural bodies having a test piece shape of 75 mmφ × 60 mml and no outerwall under air pressure of 1.4 kg/cm². Measuring method is performed in accordance with "Ceramic Regenerator System Development Program—Final Report"on page 213 in USA DOE/NASA/0008-12, NASACR-165139
*[5] X-ray diffraction. Qunatitative values on ZnO internal standard
*[6] Durable temperature when held for 30 min in an electric furnace and exposing to room temperature
*[7] Glass powder or cordierite powder is deposited on the No. 18 sintered body such that 20% of the powder adhered to open pores. Also see date in U.S. Pat. No. 4,489,774

TABLE 3

| Cell shape | 31 | 32 | 33 | 34 | 35 | 36 | 37 | 38 | 39 | 40 |
|---|---|---|---|---|---|---|---|---|---|---|
| | | | Square | | | Triangle | | Rectangle $\left(\frac{\text{Long side}}{\text{Short side}}\right) = 1.73/1$ | | |
| Wall thickness (μm) | 203 | 152 | 102 | 102 | 140 | 90 | 90 | 120 | 102 | 90 |
| Cell density (cell/cm²) | 62 | 93 | 93 | 190 | 145 | 190 | 250 | 167 | 217 | 248 |
| Pressure loss* (mmH₂O/mm) | 0.40 | 0.55 | 0.48 | 0.81 | 0.97 | 0.98 | 1.18 | 0.92 | 1.21 | 1.43 |
| Leakage amount** (g/s·m²) | 57 | 49 | 52 | 48 | 32 | 56 | 51 | 37 | 48 | 47 |
| CTE (× 10⁻⁶/°C.(40-800° C.)) | 0.6 | 0.6 | 0.6 | 0.6 | 0.7 | 0.7 | 0.8 | 0.6 | 0.7 | 0.8 |

*Pressure loss per unit length measured at flow rate of 0.5 g/sec · cm²
**Measured with the use of honeycomb structural bodies having a test piece shape of 75 mmΦ × 60 mml and no outer wall under air pressure of 1.4 kg/cm²

EXAMPLE 3

Raw materials of chemical compositions and particle sizes as shown in the following Table 4 are mixed based on the batch composition and the particle sizes of talc and kaolin as shown in Table 5 to prepare batches Nos. 101-140 of Table 5. To 100 parts by weight of the mixed batch of the raw materials are added 4.5 parts by weight of methylcellulose and a suitable amount of water and the resulting mixture is kneaded to produce an extrudable blend. The raw materials are all preliminarily treated to pass a sieve of 63 μm. Then, each blend of the respective batch is formed by a known extrusion means into a cylindrical honeycomb structural body of a diameter of 93 mm and a height of 100 mm having a partition wall thickness of 120 μm, a cell number of 167 per cm² and a rectangular cell structure (short side/long side=1/1.73). The honeycomb structural bodies of respective batches are dried and fired at firing conditions shown in Table 5 to obtain sintered honeycomb structural bodies. The sintered bodies are evaluated for their coefficient of thermal expansion (CTE) in the range 40°-800° C., total pore volume of a pore diameter of not less than 2 μm, leakage amount, amount of cordierite crystals, and thermal shock resistance as properties of the sintered bodies. The results of the evaluation are also shown in Table 5. All the sintered bodies have chemical compositions of $P_2O_5$ content of less than 0.1%.

TABLE 4

| | Average particle diameter (μm) | Ig.loss | $SiO_2$ | $Al_2O_3$ | MgO | $TiO_2$ | $Fe_2O_3$ | $CaO + Na_2O + K_2O$ | |
|---|---|---|---|---|---|---|---|---|---|
| Talc (a) | 7.5 | 5.6 | 61.3 | 1.0 | 30.7 | — | 1.0 | 0.3 | |
| Talc (b) | 5.0 | 5.7 | 60.9 | 1.2 | 30.8 | — | 0.9 | 0.3 | |
| Talc (c) | 3.0 | 5.7 | 61.2 | 0.9 | 30.9 | — | 0.9 | 0.3 | |
| Kaoline (a) | 2.0 | 13.9 | 45.6 | 38.7 | — | 0.8 | 0.3 | 0.2 | |
| Kaoline (b) | 1.0 | 13.9 | 45.7 | 38.7 | — | 0.8 | 0.3 | 0.2 | |
| Kaoline (c) | 0.4 | 13.9 | 45.5 | 38.8 | — | 1.0 | 0.4 | 0.2 | |
| Kaoline (d) | 0.2 | 13.9 | 45.3 | 38.1 | — | 1.4 | 0.6 | 0.2 | |
| Calcined kaoline (a) | 2.0 | 0.1 | 53.1 | 45.1 | — | 0.9 | 0.4 | 0.2 | |
| Calcined kaoline (b) | 1.0 | 0.1 | 53.2 | 45.1 | — | 0.9 | 0.4 | 0.2 | |
| Calcined kaoline (c) | 0.8 | 0.1 | 53.2 | 45.0 | — | 0.8 | 0.4 | 0.2 | |
| Alumina (a) | 4.0 | 0.3 | — | 99.2 | — | — | — | 0.33 | |
| Alumina (b) | 2.0 | 0.2 | — | 99.3 | — | — | — | 0.34 | |
| Alumina (c)*[1] | 1.7 | 0.2 | — | 99.5 | — | — | — | 0.12 | $Na_2O$ |
| Alumina (d)*[1] | 1.0 | 0.2 | — | 99.6 | — | — | — | 0.06 | |
| Aluminum hydroxide (a) | 3.6 | 34.5 | — | 65.0 | — | — | — | 0.2 | |
| Aluminum hydroxide (b) | 2.0 | 34.3 | — | 64.9 | — | — | — | 0.3 | |
| Aluminum hydroxide (c) | 1.7 | 34.1 | — | 64.9 | — | — | — | 0.3 | |
| Aluminum | 1.2 | 34.0 | — | 65.1 | — | — | — | 0.3 | |

TABLE 4-continued

| | Average particle diameter (μm) | Ig.loss | SiO2 | Al2O3 | MgO | TiO2 | Fe2O3 | CaO + Na2O + K2O |
|---|---|---|---|---|---|---|---|---|
| hydroxide (d) | | | | | | | | |
| Silica (a)*2 | 8.0 | 0.1 | 99.6 | 0.1 | — | — | 0.1 | — |
| Silica (b)*2 | 5.0 | 0.1 | 99.7 | 0.1 | — | — | 0.1 | — |
| Silica (c)*3 | 5.6 | 0.2 | 99.4 | 0.1 | — | — | — | — |

*1 Alumina of low sodium content (Na2O content of not more than 0.12%)
*2 Amorphous fused silica
*3 Crystalline silica
*Particle size distributions and average particle diameter are measured in the same way as in Example 1.

TABLE 5

| Test No. | Talc (average particle diameter μm) | Kaoline (average particle diameter μm) | Calcined kaoline (average particle diameter μm) | Alumina (average particle diameter μm) | Aluminum hydroxide (average particle diameter μm) | Silica | Ratio of average particle diameter kaoline/talc |
|---|---|---|---|---|---|---|---|
| 101 | 40.5(7.5) | 25.0(1.0) | 20.8(2.0) | 13.7(2.0 | — | — | 1/5.2 |
| 102 | 40.5(5.0) | 25.0(1.0) | 20.8(2.0) | 13.7(2.0) | — | — | 1/3.4 |
| 103 | 40.5(5.0) | 25.0(1.0) | 20.8(1.0) | 13.7(2.0) | — | — | 1/5.0 |
| 104 | 40.5(3.0) | 25.0(0.2) | 20.8(1.0) | 13.7(2.0) | — | — | 1/5.3 |
| 105 | 40.5(3.0) | 25.0(0.2) | 20.8(0.8) | 13.7(2.0) | — | — | 1/6.3 |
| 106 | 40.5(5.0) | 25.0(1.0) | 20.8(2.0) | 13.7(4.0) | — | — | 1/3.4 |
| 107 | 40.5(3.0) | 25.0(1.0) | 20.8(2.0) | 13.7(2.0) | — | — | 1/2.1 |
| 108 | 40.5(5.0) | 25.0(1.0) | 20.8(2.0) | 13.7(1.7)* | — | — | 1/3.4 |
| 109 | 40.5(5.0) | 25.0(1.0) | 20.8(1.0) | 13.7(1.7)* | — | — | 1/5.0 |
| 110 | 40.5(5.0) | 25.0(0.2) | 20.8(0.8) | 13.7(1.7)* | — | — | 1/6.3 |
| 111 | 40.5(5.0) | 25.0(1.0) | 20.8(1.0) | 13.7(1.0)* | — | — | 1/5.0 |
| 112 | 40.5(3.0) | 25.0(0.2) | 20.8(1.0) | 13.7(1.0)* | — | — | 1/5.3 |
| 113 | 40.5(3.0) | 25.0(0.2) | 20.8(0.8) | 13.7(1.0)* | — | — | 1/6.3 |
| 114 | 41.0(3.0) | 27.5(0.2) | 17.5(0.8) | 14.0(1.7)* | — | — | 1/6.9 |
| 115 | 41.0(3.0) | 27.5(0.2) | 17.5(0.8) | 14.0(1.0)* | — | — | 1/6.9 |
| 116 | 39.1(5.0) | 29.1(1.0) | 16.0(2.0) | 9.0(2.0) | 6.8 (3.6) | — | 1/3.7 |
| 117 | 39.1(5.0) | 29.1(1.0) | 16.0(2.0) | 9.0(2.0) | 6.8 (2.0) | — | 1/3.7 |
| 118 | 39.1(3.0) | 29.1(0.4) | 16.0(0.8) | 9.0(1.0)* | 6.8 (1.7) | — | 1/5.5 |
| 119 | 38.0(5.0) | 25.6(1.0) | 18.4(1.0) | — | 18.0(3.6) | — | 1/5.0 |
| 120 | 38.0(3.0) | 25.6(0.4) | 18.4(1.0) | — | 18.0(2.0) | — | 1/4.6 |

| | Firing conditions | | | Properties of sintered body | | | | | |
|---|---|---|---|---|---|---|---|---|---|
| Test No. | Temperature raising rate *1 (°C./Hr) | Maximum temperature (°C.) | Holding time (Hr) | CTE × 10⁻⁶ (/°C.) | Porosity*2 (%) | Total volume*3 of pores of a pore diameter of not less than 2 μm (cc/g) | Leakage*4 amount (g/s·m²) | Amount*5 of cordierite crystal (wt %) | Thermal*6 shock resistance (°C.) |
| 101 | 60 | 1410 | 6 | 0.7 | 26.4 | 0.103 | 100 | 93 | 800 |
| 102 | 60 | 1410 | 6 | 0.7 | 26.2 | 0.050 | 30 | 92 | 800 |
| 103 | 60 | 1410 | 6 | 0.6 | 25.9 | 0.030 | 20 | 92 | 800 |
| 104 | 60 | 1410 | 6 | 0.7 | 25.1 | 0.016 | 13 | 92 | 800 |
| 105 | 60 | 1410 | 6 | 0.8 | 20.9 | 0.012 | 8 | 92 | 750 |
| 106 | 60 | 1410 | 6 | 0.6 | 26.0 | 0.065 | 38 | 93 | 850 |
| 107 | 60 | 1410 | 6 | 1.1 | 26.2 | 0.043 | 27 | 92 | 700 |
| 108 | 60 | 1410 | 6 | 0.6 | 25.3 | 0.046 | 24 | 93 | 850 |
| 109 | 60 | 1410 | 6 | 0.6 | 25.4 | 0.028 | 18 | 93 | 850 |
| 110 | 60 | 1410 | 6 | 0.8 | 20.4 | 0.010 | 7 | 93 | 800 |
| 111 | 60 | 1410 | 6 | 0.6 | 23.5 | 0.027 | 15 | 93 | 800 |
| 112 | 60 | 1410 | 6 | 0.7 | 21.6 | 0.011 | 12 | 94 | 800 |
| 113 | 80 | 1410 | 6 | 0.6 | 18.6 | 0.008 | 5 | 93 | 850 |
| 114 | 50 | 1400 | 6 | 0.8 | 21.5 | 0.013 | 10 | 94 | 750 |
| 115 | 50 | 1400 | 6 | 0.8 | 19.9 | 0.010 | 6 | 94 | 750 |
| 116 | 50 | 1410 | 4 | 0.9 | 27.4 | 0.081 | 64 | 95 | 700 |
| 117 | 50 | 1410 | 4 | 0.8 | 24.1 | 0.065 | 27 | 96 | 750 |
| 118 | 50 | 1410 | 4 | 0.6 | 22.2 | 0.019 | 16 | 95 | 850 |
| 119 | 50 | 1410 | 4 | 0.9 | 27.9 | 0.070 | 60 | 95 | 700 |
| 120 | 50 | 1410 | 4 | 0.8 | 24.3 | 0.044 | 20 | 96 | 750 |

| Test No. | Talc (average particle diameter μm) | Kaoline (average particle diameter μm) | Calcined kaoline (average particle diameter μm) | Alumina (average particle diameter μm) | Aluminum hydroxide (average particle diameter μm) | Silica | Ratio of average particle diameter kaoline/talc |
|---|---|---|---|---|---|---|---|
| 121 | 39.5(5.0) | 14.0(1.0) | 9.5(2.0) | 12.5(2.0) | 14.5(2.0) | 10.0(8.0) | 1/3.6 |
| 122 | 39.5(5.0) | 17.0(1.0) | 11.0(2.0) | 13.0(2.0) | 8.0(8.0) | 1/3.6 | |
| 123 | 39.5(3.0) | 17.0(0.2) | 11.0(0.8) | 11.5(1.06)* | 13.0(1.2) | 8.0(8.0) | 1/6.9 |

TABLE 5-continued

| | | | | | | | |
|---|---|---|---|---|---|---|---|
| 124 | 39.5(7.0) | 21.0(1.0) | 13.0(2.0) | 11.5(2.0) | 10.0(2.0) | 5.0(8.0) | 1/5.1 |
| 125 | 39.5(5.0) | 21.0(1.0) | 13.0(2.0) | 11.5(2.0) | 10.0(2.0) | 5.0(8.0) | 1/3.6 |
| 126 | 39.5(5.0) | 21.0(1.0) | 13.0(2.0) | 11.5(2.0) | 10.0(3.6) | 5.0(8.0) | 1/3.6 |
| 127 | 39.5(5.0) | 21.0(1.0) | 13.0(2.0) | 11.5(2.0) | 10.0(2.0) | 5.0(5.0) | 1/3.6 |
| 128 | 39.5(5.0) | 21.0(1.0) | 13.0(2.0) | 11.5(2.0) | 10.0(2.0) | 5.0(5.6)** | 1/3.6 |
| 129 | 39.5(3.0) | 21.0(0.4) | 13.0(1.0) | 11.5(2.0) | 10.0(1.7) | 5.0(5.0) | 1/4.8 |
| 130 | 39.5(3.0) | 21.0(0.4) | 13.0(0.8) | 11.5(2.0) | 10.0(1.2) | 5.0(5.0) | 1/5.4 |
| 131 | 39.5(5.0) | 21.0(1.0) | 13.0(2.0) | 11.5(1.7)* | 10.0(2.0) | 5.0(5.0) | 1/3.6 |
| 132 | 39.5(3.0) | 21.0(0.4) | 13.0(1.0) | 11.5(1.7)* | 10.0(1.7) | 5.0(5.0) | 1/4.8 |
| 133 | 39.5(3.0) | 21.0(0.4) | 13.0(0.8) | 11.5(1.7)* | 10.0(1.2) | 5.0(5.0) | 1/5.4 |
| 134 | 39.5(5.0) | 21.0(2.0) | 13.0(0.8) | 11.5(1.7)* | 10.0(1.2) | 5.0(8.0) | 1/3.2 |
| 135 | 39.5(5.0) | 21.0(2.0) | 13.0(0.8) | 11.5(1.0)* | 10.0(1.2) | 5.0(8.0) | 1/3.2 |
| 136 | 39.5(3.0) | 21.0(0.4) | 13.0(1.0) | 11.5(1.0)* | 10.0(1.2) | 5.0(5.0) | 1/4.8 |
| 137 | 39.5(3.0) | 21.0(0.2) | 13.0(0.8) | 11.5(1.0)* | 10.8(1.2) | 5.0(5.0) | 1/7.0 |
| 138 | 40.0(3.0) | 22.0(0.2) | 16.2(0.8) | 11.0(1.0)* | 7.8(1.2) | 3.0(5.0) | 1/6.6 |
| 139 | 40.0(5.0) | 22.0(0.2) | 16.2(0.8) | 11.0(2.0) | 7.8(2.0) | 3.0(8.0) | 1/3.4 |
| 140 | 40.0(3.0) | 25.0(0.2) | 17.5(0.8) | 11.5(1.0)* | 5.0(1.2) | 1.0(5.0) | 1/6.7 |

| | Firing conditions | | | Properties of sintered body | | | | |
|---|---|---|---|---|---|---|---|---|
| Test No. | Temper-*1 ature raising rate (°C./Hr) | Maximum temperature (°C.) | Holding time (Hr) | CTE × 10$^{-6}$ (/°C.) | Porosity*2 (%) | Total volume*3 of pores of a pore diameter of not less than 2 μm (cc/g) | Leakage*4 amount (g/s · m$^2$) | Amount*5 of cordierite crystal (wt %) | Thermal*6 shock reisitance (°C.) |
| 121 | 60 | 1410 | 10 | 0.3 | 33.9 | 0.110 | 120 | 90 | 950 |
| 122 | 60 | 1410 | 10 | 0.4 | 30.0 | 0.049 | 30 | 91 | 900 |
| 123 | 60 | 1410 | 10 | 0.4 | 26.7 | 0.025 | 18 | 92 | 850 |
| 124 | 60 | 1410 | 10 | 0.4 | 29.1 | 0.098 | 105 | 90 | 900 |
| 125 | 60 | 1410 | 10 | 0.4 | 28.7 | 0.048 | 26 | 91 | 900 |
| 126 | 60 | 1410 | 10 | 1.1 | 30.3 | 0.070 | 51 | 90 | 700 |
| 127 | 60 | 1410 | 10 | 0.4 | 27.4 | 0.035 | 22 | 91 | 900 |
| 128 | 60 | 1410 | 10 | 0.7 | 30.7 | 0.052 | 33 | 90 | 800 |
| 129 | 60 | 1410 | 10 | 0.5 | 25.7 | 0.024 | 17 | 91 | 900 |
| 130 | 60 | 1410 | 10 | 0.6 | 24.2 | 0.015 | 12 | 90 | 850 |
| 131 | 60 | 1410 | 10 | 0.4 | 27.3 | 0.033 | 21 | 91 | 900 |
| 132 | 60 | 1410 | 10 | 0.5 | 25.6 | 0.017 | 15 | 91 | 900 |
| 133 | 60 | 1410 | 10 | 0.5 | 23.9 | 0.013 | 10 | 91 | 850 |
| 134 | 60 | 1410 | 10 | 0.5 | 23.8 | 0.077 | 28 | 90 | 850 |
| 135 | 60 | 1410 | 10 | 0.5 | 23.7 | 0.052 | 22 | 91 | 850 |
| 136 | 60 | 1410 | 10 | 0.5 | 23.9 | 0.014 | 9 | 91 | 850 |
| 137 | 60 | 1410 | 10 | 0.4 | 22.3 | 0.008 | 7 | 91 | 850 |
| 138 | 60 | 1410 | 10 | 0.6 | 22.0 | 0.007 | 8 | 92 | 800 |
| 139 | 60 | 1410 | 10 | 0.6 | 24.2 | 0.069 | 26 | 92 | 800 |
| 140 | 60 | 1410 | 10 | 0.6 | 21.8 | 0.009 | 7 | 93 | 800 |

*1 Average temperature raising rate in a temperature range of 1,100-1,350°C.
*2 Mercury porosimeter. Calculated on total pore volume (assumed cordierite true density of 2.52)
*3 Mercury porosimeter
*4 Measured with the use of the honeycomb structural bodies having a test piece shape of 75 mmφ × 60 mml and no outer wall under air pressure of 1.4 kg/cm$^2$. Measuring method was performed in accordance with "Ceramic Regenerator System Development Program-Final Report on page 213 in USA DOE/NASA/0008-12, NASACR-165139
*5 X-ray diffraction. Quantitative values on ZnO internal standard
*6 Durable temeperature when held for 30 min in an electric furnace and exposing to room temeprature.
*Alumina of low sodium
**Crystalline silica As shown in Table 5, tests Nos. 102–105, 108–115, 117, 118 and 120 wherein talc particles of an average particle diameter of not more than 5 μm and kaolin particle of an average particle diameter of not more than 2 μm and not exceeding one-third (⅓) of the average particle diameter of talc, are admixed with alumina and/or aluminum hydroxide particles of an average particle diameter of not more than 2 μm, and tests Nos. 122, 123, 125, 127 and 129–140, wherein higly pure amourphous silica particle of an average particle diameter of not more than 8 μm is further added thereto, to satisfy the total pore volume of a pore diameter of not less than 2 μm restricted according to the invention.

Further, relations between the leakage amount and the total pore volume of a pore diameter of not less than 2 μm in test pieces are determined at both porosities of less than 25% and not less than 25% under air pressure of 1.4 kg/cm$^2$, respectively, to obtain the results shown in FIG. 5. In FIG. 5, white circles represent data on the porosity of less than 25% and black circles represent data on the porosity of not less than 25%. As seen from FIG. 5, in order to achieve the leakage amount of 30 g/sec.m$^2$ as required by the invention, it is required that when the porosity is less than 25%, the total pore volume of a pore diameter of not less than 2 μm is not more than 0.08 cc/g and when it is not less than 25%, such a total volume is not more than 0.05 cc/g.

Examples of tests Nos. 101 and 124 use talc particles of a particle diameter of not less than 5 μm, tests No. 106 uses alumina particles of a particle diameter of not less than 2 μm, tests Nos. 116, 119 and 120 use aluminum hydroxide particles of a particle diameter of not less than 2 μm, test No. 107 makes a ratio of average particle diameter of kaolin to that of talc of not less than one-third (⅓), test No. 121 uses an amount of added silica of not less than 8.0% and test No. 128 uses crystalline silica as a silica source material, so that the total pore volume and/or the thermal expansion property are not satisfied.

EXAMPLE 4

The batch of test No. 136 in Table 5 is formed into honeycomb structures by extrusion from dies of different cell structures in the same way as in Example 3, and the extruded articles are dried and fired to produce cylindrical honeycomb structural bodies Nos. 141-150 of a diameter of 93 mm and a height of 100 mm having a cell structure as shown in Table 5. Respective honeycomb structural bodies are evaluated on pressure loss, leakage amount and coefficient of thermal expansion (CTE). The results of the evaluation are shown in the following Table 6 and the shape of the resulting honeycomb structural body is represented in FIG. 4.

TABLE 6

| Cell shape | 141 | 142 | 143 | 144 | 145 | 146 | 147 | 148 | 149 | 150 |
|---|---|---|---|---|---|---|---|---|---|---|
| | \multicolumn{7}{c}{Square} | | | Triangle | | $\left(\frac{\text{Long side}}{\text{Short side}}\right) = 1.73/1$ Rectangle | | |
| Wall thickness ($\mu$m) | 203 | 152 | 102 | 102 | 140 | 90 | 90 | 120 | 102 | 90 |
| Cell density (cell/cm$^2$) | 62 | 93 | 93 | 190 | 145 | 190 | 250 | 167 | 217 | 248 |
| Pressure loss* (mmH$_2$O/mm) | 0.40 | 0.55 | 0.48 | 0.81 | 0.97 | 0.98 | 1.18 | 0.92 | 1.21 | 1.43 |
| Leakage amount** (g/s · m$^2$) | 24 | 19 | 20 | 17 | 8 | 23 | 19 | 9 | 16 | 15 |
| CTE ($\times 10^{-6}$/°C.(40-800° C.)) | 0.5 | 0.5 | 0.5 | 0.5 | 0.6 | 0.6 | 0.7 | 0.5 | 0.6 | 0.7 |

*Pressure loss per unit length measured at flow rate of 0.5 g/sec · cm$^2$
**Measured with the use of honeycomb structural bodies having a test piece shape of 75 mm$\Phi$ × 60 mml and no outer wall under air pressure of 1.4 kg/cm$^2$ As described in Tables 2 and 3, according to the invention, it is possible to obtain a honeycomb structural body of a total pore volume of a pore diameter of not less than 5 $\mu$m of not more than 0.04 cc/g and a coefficient of thermal expansion (CTE) of not more than $1.0 \times 10^{-6}$/°C., which has an improved thermal shock resistance, a small leakage amount and an improved heat exchanging efficiency.

According to the invention, it is also possible to obtain a honeycomb structure of a total pore volume of a pore diameter of not less than 2 $\mu$m of not more than 0.05 cc/g or, where the porosity in the ceramic material is not more than 25%, of not more than 0.08 cc/g and coefficient of thermal expansion of not more than $1.0 \times 10^{-6}$/°C., or $0.6 \times 10^{-6}$/°C., which has an improved thermal shock resistance, a very small leakage amount and an improved heat exchanging efficiency.

The cordierite honeycomb structural bodies according to the invention are very useful in a several fields.

What is claimed is:

1. A cordierite honeycomb structural body comprising crystalline phases consisting essentially of cordierite, a total pore volume of a pore diameter of not less than 5 $\mu$m of not more than 0.04 cc/g, a coefficient of thermal expansion of not more than $1.0 \times 10^{-6}$/°C. in the temperature range of 40°-800° C., and a chemical composition by weight of 42-56% of SiO$_2$, 30-45% of Al$_2$O$_3$ and 12-16% of MgO.

2. The cordierite honeycomb structural body of claim 1, wherein the total volume of a pore diameter of not less than 5 $\mu$m is not more than 0.026 cc/g.

3. The cordierite honeycomb structural body of claim 1, wherein a density of cells per unit area is not less than about 62 cells/cm$^2$ or 400 cells/in$^2$ and a partition wall thickness is not more than about 203 $\mu$m or 8 mil.

4. A heat exchanger including the cordierite honeycomb structural body of claim 1.

5. A cordierite honeycomb structural body, comprising crystalline phases consisting essentially of cordierite, a total pore volume of a pore diameter of not less than 2 $\mu$m of not more than 0.05 cc/g or, where the porosity in the ceramic material is not more than 25%, of not more than 0.08 cc/g, a coefficient of thermal expansion of not more than $1.0 \times 10^{-6}$/°C. in a temperature range of 40°-800° C., and a chemical composition by weight of 42-56% of SiO$_2$, 30-45% of Al$_2$O$_3$ and 12-16% of MgO.

6. The cordierite honeycomb structural body of claim 5, wherein the total volume of a pore diameter of not less than 2 $\mu$m is not more than 0.03 cc/g or the total volume of a pore diameter of not less than 2 $\mu$m where the porosity in the ceramic material is not more than 25% is not more than 0.05 cc/g.

7. The cordierite honeycomb structural body of claim 5, wherein a density of cells per unit are is not less than about 62 cells/cm$^2$ or 400 cells/in$^2$ and a partition wall thickness is not more than about 203 $\mu$m or 8 mil.

8. A heat exchanger including the cordierite honeycomb structural body of claim 5.

9. The cordierite honeycomb structural body of claim 5, wherein the coefficient of thermal expansion is not more than $0.6 \times 10^{-6}$/°C. in a temperature range of 40°-800° C.

* * * * *